(12) United States Patent
Bozeman et al.

(10) Patent No.: US 12,724,007 B2
(45) Date of Patent: Sep. 1, 2026

(54) DIGITAL POTENTIOSTAT WITH MAXIMUM POWER POINT TRACKING (DPStat)

(71) Applicant: The United States of America, as represented by the Secretary of the Navy, Arlington, VA (US)

(72) Inventors: Eric G. Bozeman, La Mesa, CA (US); Matthew L. Bond, San Diego, CA (US); Yolanda Meriah Arias-Thode, San Diego, CA (US); Halah S. Ramzi, El Cajon, CA (US); Taneka N. Lewis, San Diego, CA (US); Gregory Anderson, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 130 days.

(21) Appl. No.: 18/979,301

(22) Filed: Dec. 12, 2024

(65) Prior Publication Data

US 2026/0168961 A1 Jun. 18, 2026

(51) Int. Cl.
*G01N 27/48* (2006.01)

(52) U.S. Cl.
CPC .................................... *G01N 27/48* (2013.01)

(58) Field of Classification Search
CPC ........................... G01N 27/48; G06K 7/10148
USPC ...................................................... 324/76.11
See application file for complete search history.

(56) References Cited

U.S. PATENT DOCUMENTS

| | | | | |
|---|---|---|---|---|
| 4,498,039 A * | 2/1985 | Galwey | G01N 27/416 | 204/406 |
| 5,198,771 A * | 3/1993 | Fidler | G01N 27/49 | 324/438 |
| 5,512,831 A * | 4/1996 | Cisar | G01R 1/203 | 324/426 |
| 2012/0205258 A1* | 8/2012 | Noble | G01N 27/48 | 204/406 |
| 2016/0123921 A1* | 5/2016 | Li | G01N 27/416 | 204/406 |

* cited by examiner

*Primary Examiner* — Arleen M Vazquez
(74) *Attorney, Agent, or Firm* — Naval Information Warfare Center Pacific; Kyle Eppele; J. Eric Anderson

(57) ABSTRACT

A digital potentiostat for monitoring energy produced by a system under test (SUT) comprising: a connection port configured to be connected to the SUT, wherein the SUT comprises an anode and a cathode; a plurality of current-measurement resistors, each having a known resistance, wherein one of the current-measurement resistors is designated as an optimal resistor; a switch operatively coupled to the plurality of current-measurement resistors; and a microcontroller operatively coupled to the connection port and to the switch, wherein the microcontroller is configured to monitor energy produced by the SUT by measuring a SUT output voltage across the optimal resistor, and wherein the microcontroller is further configured to direct the switch to change which current-measurement resistor is designated as the optimal resistor based on measured changes in the energy produced by the SUT.

20 Claims, 4 Drawing Sheets

DIGITAL POTENTIOSTAT WITH MAXIMUM POWER POINT TRACKING (DPStat)

FEDERALLY-SPONSORED RESEARCH AND DEVELOPMENT

The United States Government has ownership rights in the invention claimed herein. Licensing and technical inquiries may be directed to the Office of Research and Technical Applications, Naval Information Warfare Center Pacific, Code 72110, San Diego, CA, 92152; voice (619) 553-5118; NIWC_Pacific_T2@us.navy.mil. Reference Navy Case Number 211407.

BACKGROUND OF THE INVENTION

The present invention relates to potentiometers and potentiostats, specifically to digital potentiometers and potentiostats designed for precise measurement and control of electrical parameters in various applications, including but not limited to, energy harvesting systems, bioelectrochemical systems, and other scientific instrumentation. Digital potentiometers, also known as digital pots, are electronic devices used to simulate the function of a mechanical potentiometer. They provide adjustable resistance in an electronic circuit, controlled by digital signals rather than manual adjustment. Traditional digital potentiometers are widely used in various applications such as volume controls in audio systems, adjustable power supplies, and sensor calibration. There is a need for an improved digital potentiometer. A potentiostat is an electronic circuit typically used in electrochemical experiments to control the voltage potential in the system based on a reference potential.

SUMMARY

Described herein is a digital potentiostat (DPStat) for monitoring energy produced by a system under test (SUT). The DPStat comprises a connection port, a plurality of current-measurement resistors, a switch, and a microcontroller. The connection port is configured to be connected to the SUT that comprises an anode and a cathode. Each of the plurality of current-measurement resistors has a known resistance. One of the current-measurement resistors is designated as an optimal resistor. The switch is operatively coupled to the plurality of current-measurement resistors. The microcontroller is operatively coupled to the connection port and to the switch. The microcontroller is configured to monitor energy produced by the SUT by measuring a SUT output voltage across the optimal resistor, and the microcontroller is further configured to direct the switch to change which current-measurement resistor is designated as the optimal resistor based on measured changes in the energy produced by the SUT.

A digital potentiometer system embodiment of the DPStat for measuring the energy output of a microbial fuel cell (MFC) is also described herein as comprising a low power microcontroller, a current-measuring resistor, an automated selection mechanism, and an output unit. The current-measuring resistor is configured to measure the current output of the MFC. The automated selection mechanism is operatively connected to the microcontroller and configured to automatically select the value of the current-measuring resistor. The low power microcontroller in this embodiment is configured to control the operation of the system and comprises: an intelligent protocol, known as Maximum PowerPoint Tracking (MPPT). The MPPT comprises: a mechanism to measure an open circuit voltage (OCV) of the MFC; a reference voltage generator; a measurement logging module; an external memory interface; a comparison module; an optimization module; and an adjustment mechanism. The measurement logging module is integrated within the microcontroller and configured to log the OCV and indirect current measurements to the internal memory of the microcontroller. The external memory interface is operatively connected to the microcontroller, allowing additional memory to be used if the internal memory is insufficient. The reference voltage generator is configured to set a reference voltage as a fraction of the measured OCV. The comparison module is configured to compare the voltage measured across the current-measuring resistor (referred to as MFC voltage) to the reference voltage. The optimization module is configured to determine if the current-measuring resistor's value is optimal based on the comparison results. The adjustment mechanism is configured to change the value of the current-measuring resistor if it is not optimal, ensuring the system operates at peak energy harvesting potential. The output unit is configured to display or communicate the determined measurements and adjustments.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Figure 1:
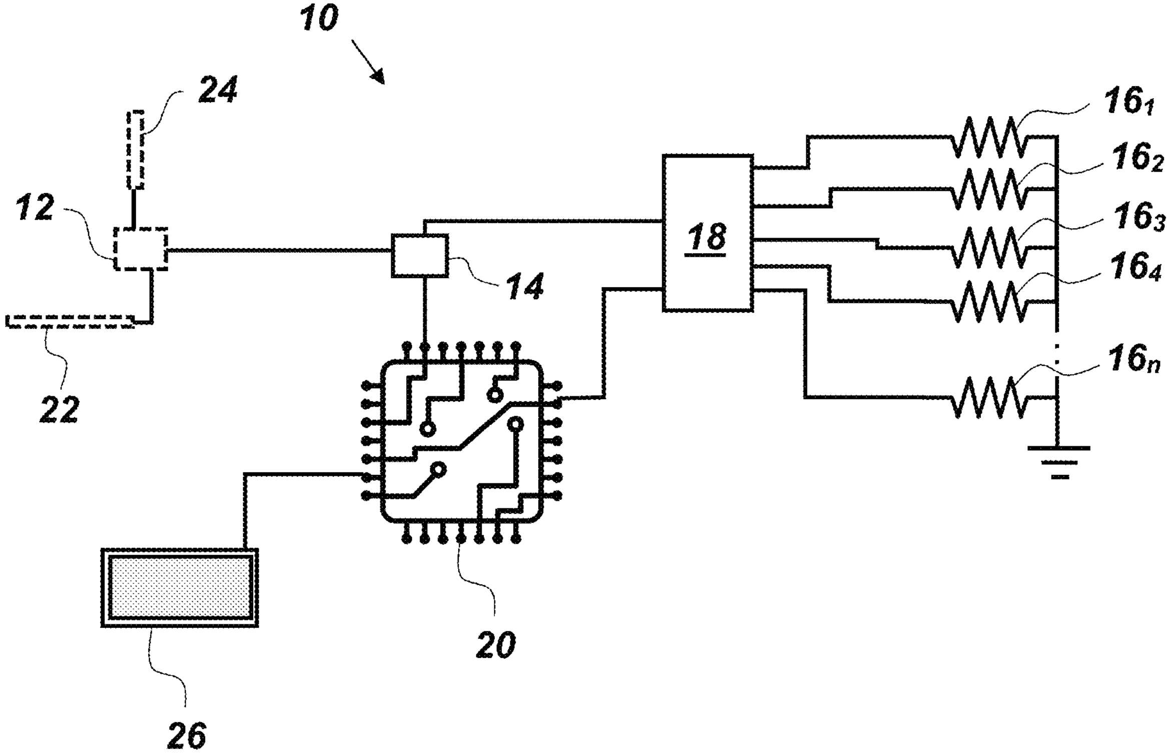
FIG. 1 is a block diagram of an embodiment of a digital potentiostat.

FIG. 1 is a schematic of an embodiment of a digital potentiostat (DPStat) 10 for monitoring energy produced by a system under test (SUT) 12. The DPStat 10 comprises, consists of, or consists essentially of a connection port 14, a plurality of current-measurement resistors $\mathbf{16_1}$-$\mathbf{16_n}$, a switch 18, and a microcontroller 20. The connection port 14 is configured to be connected to the SUT 12, which comprises an anode 22 and a cathode 24. Each of the plurality of current-measurement resistors $\mathbf{16_1}$-$\mathbf{16_n}$ has a known resistance and one of the current-measurement resistors 16 is designated as an optimal resistor. The switch 18 is operatively coupled to the plurality of current-measurement resistors 16 and to the microcontroller 20. The microcontroller is also operatively coupled to the connection port 14 and is configured to monitor energy produced by the SUT 12 by measuring a SUT output voltage across the optimal resistor. The microcontroller 20 is further configured to direct the switch 18 to change which current-measurement resistor is designated as the optimal resistor based on measured changes in the energy produced by the SUT 12. The embodiment of the DPStat 10 shown in FIG. 1 includes an optional output unit 26.

In one example operational scenario, the DPStat 10 may be used to monitor the energy being harvested from the microbes where the SUT 12 is a benthic MFC. This may be done by measuring the OCV voltage potential between the MFC's anode 22 and cathode 24, and measuring the current being provided from the SUT 12. The current may be measured indirectly by measuring the voltage drop across the optimal current-measurement resistor 16 with a known resistance, then calculating the current using Ohm's Law (V=I*R). The power may be calculated using Watt's Law (P=I*V). The voltage and indirect current measurements may be logged with a data logger (also referred to herein as a measurement logging module) and the calculations may be performed post processing. The input voltage range of the data logger and the microcontroller 20 has a maximum and minimum limit. Were it not for the DPStat 10, depending on the OCV and the value of the current-measuring resistor, the indirect current measurement could easily fall outside a given data logger's input range. Additionally, there are times when environmental factors may allow for the energy to be harvested to be higher or lower than expected (such as warmer or colder temperatures that have a great effect on power generation by microbes).

Figure 2:
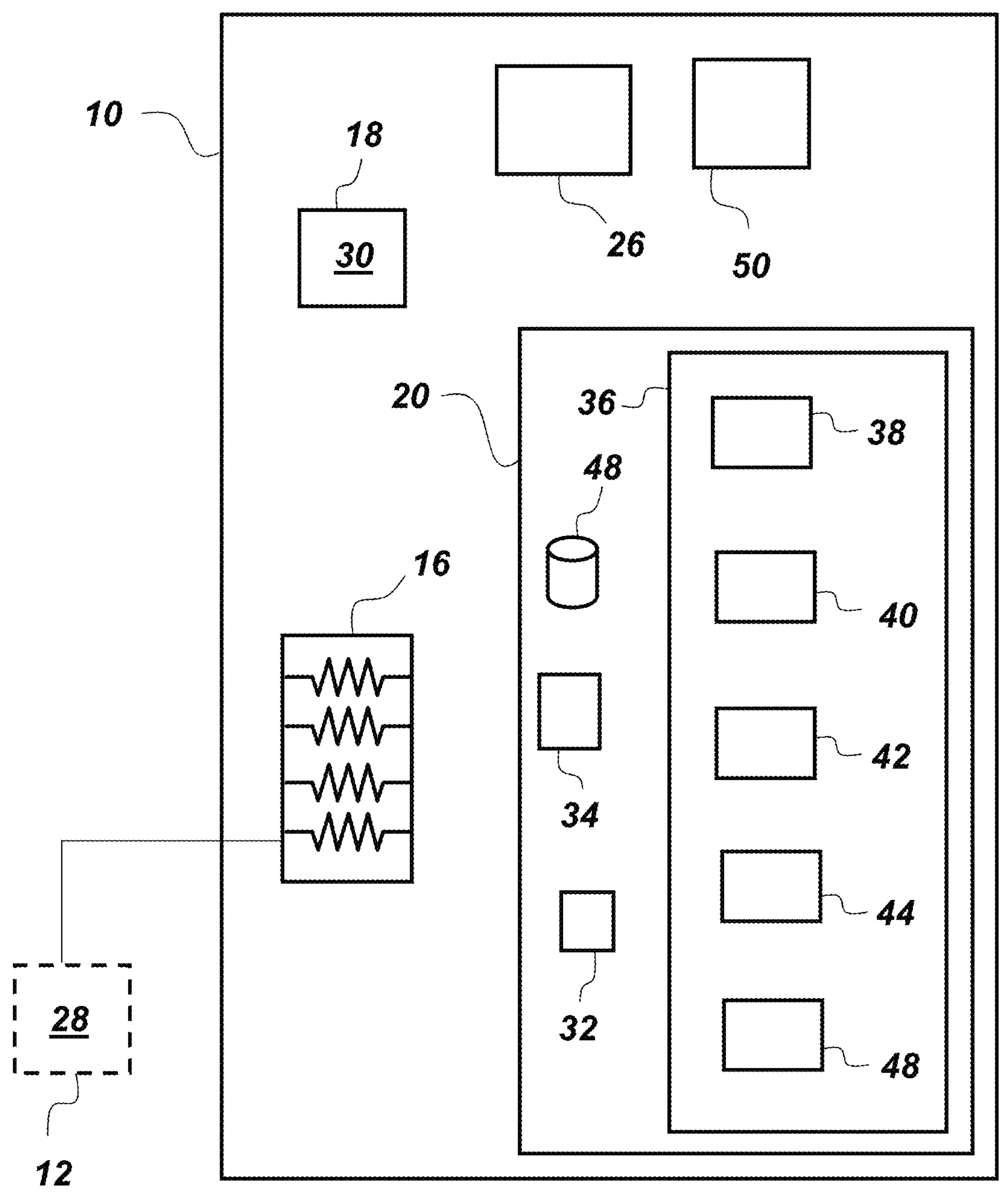
FIG. 2 is a block diagram of a digital potentiometer system embodiment of the digital potentiostat.

FIG. 2 is a block diagram of a digital potentiometer system embodiment of the DPStat 10 for measuring the energy output of the SUT 12, which in this example is an MFC 28. In this embodiment of the DPStat 10, the switch 18 is referred to as an automated selection mechanism 30, and the microcontroller 20 includes a measurement logging module 32, an external memory interface 34, and an MPPT 36. The MPPT 36 comprises an OCV measurement mechanism 38, a reference voltage generator 40, a comparison module 42, an optimization module 44, and an adjustment mechanism 46. The automated selection mechanism 30 is operatively connected to the microcontroller 20 and configured to automatically select the value of the current-measuring resistor 16. The measurement logging module 32 is integrated within the microcontroller 20 and configured to log the OCV and indirect current measurements of the MFC 28 to an internal memory 48 of the microcontroller 20. The external memory interface 34 is operatively connected to the microcontroller 20 and allows additional memory to be used if the internal memory 48 is insufficient. The reference voltage generator 40 is configured to set a reference voltage as a fraction of the measured OCV. The comparison module 42 is configured to compare the reference voltage to a voltage (referred to as MFC voltage) measured across the current-measuring resistor 16. The optimization module 44 is configured to determine if the current-measuring resistor 16's value is optimal based on the comparison results. The adjustment mechanism 46 is configured to change the value of the current-measuring resistor if it is not optimal, ensuring the DPStat 10 operates at peak energy harvesting potential. The output unit 26 is configured to display or communicate the determined measurements and adjustments.

In the field of energy harvesting and bioelectrochemical systems, such as MFCs, precise control and measurement of electrical parameters are desirable for optimizing performance and efficiency. The DPStat 10 allows for dynamic optimization based on real-time data and does not require manual adjustment to the current-measurement resistor values. The DPStat 10 may be centered around the low-power microcontroller 20 that automates the selection of the current-measuring resistor and logs various measurements for optimal system performance. The microcontroller 20 is designed to:

1. Automatically Select the Current-Measuring Resistor: The microcontroller 20 determines the optimal value of the current-measuring resistor 16 in real-time, based on the comparison of the MFC voltage and a reference voltage.
2. Log Measurements: The system logs OCV and indirect current measurements to the internal memory of the microcontroller 20. The amount of available memory depends on the space occupied by the running code. If additional memory is needed, the system can interface with an optional external memory chip.

In a typical operational scenario, the microcontroller 20 automatically chooses the value of the current-measuring resistor 16 and logs the OCV and indirect current measurements. Measurements are logged to the microcontroller's internal memory 48. The following is a description of an operational deployment of an embodiment of the DPStat 10. The DPStat 10 would be connected to a small battery 50, powered on, and then connected to the SUT 12, (e.g., placed in a pressure vessel or underwater housing mounted to an MFC frame along with the anode 22 and cathode 24). The DPStat 10's date and time would be set by a user—for example through a command line interface that is available over RS-232 communications. The user also has the option to set other control variables like sampling rate, sleep time, open circuit duration, and time between MFC voltage measurements. Once the user is finished, and has started the DPStat 10 running, it will enter a sleep mode for the specified duration. This sleep mode greatly reduces the power consumption during deployment and during the first few weeks while the MFC is "starting up". While reference is made to MFCs, it is to be understood, that the DPStat 10 is not limited to measuring power potential of MFCs alone, but may be used in any environment where measurement of energy-generation potential of a given system/device is desired.

Still referring to the MFC operational scenario described above, measurements are not usually recorded during this startup period. At the end of the sleep period, the DPStat 10 may enter Open Circuit Mode, where it will measure the OCV for a predetermined amount of time. In the Open Circuit Mode, the current-measuring resistor 16 is set to an infinite or open resistance. When it is time to leave the Open Circuit Mode, the microcontroller's Digital-to-Analog Converter (DAC) may be set to 50% of the measured OCV. This is the reference voltage. Next, the microcontroller 20's onboard comparator (i.e., comparison module 42) will compare the reference voltage to the voltage potential being measured across the current-measuring resistor 16 (a default resistor is chosen as the optimal resistor for the first comparison). This is the MFC voltage. If the MFC voltage is higher than the reference voltage, the next lower resistance value is selected. If the MFC voltage is lower than 100 mV, the next higher resistance value is selected. The microcontroller 20 selects the resistance values by communicating with the switch 18, also described as the automated selection mechanism 30. The switch 18 may be an external integrated circuit comprising a plurality of analog switches. The microcontroller 20 may alter the resistance value of the optimal current-measurement resistor 16 by instructing the switch 18 to open or close its various analog switches. These switches connect the MFC's anode 22 and cathode 24 through one of the current-measuring resistors 16 connected to that switch. The measured voltage potential and the chosen resistor are logged, so the power being harvested by the MFC can be calculated. This calculation can either be done onboard the microcontroller 20 and logged, or in post-processing once the data has been taken off the microcontroller 20. The DPStat 10 may periodically (user specified) enter the Open Circuit Mode and start this whole process over again.

Still referring to the MFC operational scenario described above, the data logged during the experiment can be pulled from the microcontroller 20 either at the end of the experiment, or while it is still ongoing. The data is read out of the memory (either the microcontroller's memory 48 or external memory connected to the external memory interface 34), for example, over the RS-232 communications link. The data be streamed into a terminal on a connected computer (not shown) and recorded using any software known to those having ordinary skill in the art. The user has the option to select higher baud rates when transferring data off the DPStat 10. These higher baud rates greatly reduce the time it takes to transfer large amounts of data. These higher baud rates will consume more power, but this is expected to be done when the user can supply power rather than when the DPStat is powered by its own small battery 50. The DPStat 10's memory may be non-volatile, so the data will not be lost when power is removed, or when the battery 50 dies. The user may clear the data, for example, using a serial port (e.g., RS-232 command interface). The user also has the option of downloading the raw data, or the formatted data. Downloading the raw data takes less time, but the data must be formatted on the user's computer after being downloaded. When the user selects to download the formatted data, the microprocessor 20 may be configured to convert the raw hexadecimal data into a human-readable format. This can add significant time to the downloading process.

Table 1 below compares baud rates and download times for various data sizes. Long cable lengths may cause erroneous data when transferred at the higher baud rates. This would need to be considered when deploying test units.

TABLE 1

| Baud | Download Type | # of Samples* | Logging Time | Download Time |
|---|---|---|---|---|
| 115200 | Formatted | 1,800 | 5 hours | 20 sec |
| 460800 | Formatted | 1,800 | 5 hours | 14 sec |
| 460800 | Formatted | 8,640 | 1 day | 60 sec |
| 460800 | Formatted | 45,600** | 5 days | 6 min |
| 460800 | Formatted | 3,200,000*** | 370 days | 7 hr |
| 460800 | Raw | 1,800 | 5 hours | 0.6 sec |
| 460800 | Raw | 45,600** | 5 days | 14 sec |
| 460800 | Raw | 3,200,000*** | 370 days | 16 min |

*# of samples per logging time is set at 10 samples per second for each example

**Max number of samples able to be stored in this embodiment of the microcontroller is 45,600

***Max # of samples able to be stored in 8MB external flash memory, used in this example, is 3,200,000

The automated resistor switching allows the optimal current-measuring resistor 16 to be changed in real time and ensures that the SUT 12 doesn't begin operating outside the limits of the DPStat 10. The DPStat 10 enables one to learn of the energy-generation potential of a given energy-harvesting system in a given environment. Without this knowledge, an MFC for example, might not be able to be optimized to harvest energy at its full potential. The automated resistor switching also enables the use of the MPPT 36, which ensures that the SUT 12 is operating at peak efficiency at all times and in all environments. This is particularly important for environments with wide changes in environmental factors such as temperature or pH (both of which impact the amount of energy able to be harvested). The energy that an MFC can harvest is directly related to temperature (and other environmental conditions). If the temperature has very wide swings throughout the year, the MPPT feature allows the MFC to adjust to those swings. Even though the overall energy being harvested may drop with lower temperatures, it would not stop all together. It also wouldn't be limited in warmer temperatures. The integrated data logging gives users the ability to log as little or as much data as possible and set specific sleep cycles or patterns to reduce the overall power consumption. It also makes it very easy to add data from various sensors (e.g., temperature, pH, salinity). Users can also integrate a transceiver for 2-way communications. This would allow the user to modify certain settings remotely and receive data in real-time without sending personnel to the site; saving time and money.

The current-measuring resistors 16 can be easily changed to fit the expected environmental conditions. A suitable example of the microcontroller 20 includes, but is not limited to, a PIC microcontroller. Suitable examples of the switch 18 include, but are not limited to, a digital switch with fixed resistors and a digital variable resistor. The digital switch consumes less power than a digital variable resistor, and the values are more stable (especially near the edges of operation). Also, the resistance steps of digital variable resistors tend to vary slightly as more power is dissipated over the resistor. This would make it very difficult to calculate the power generated by the MFC.

Figure 3:
FIG. 3 is a top-view illustration of an example printed circuit-board layout for an embodiment of a digital potentiostat.
Figure 3:
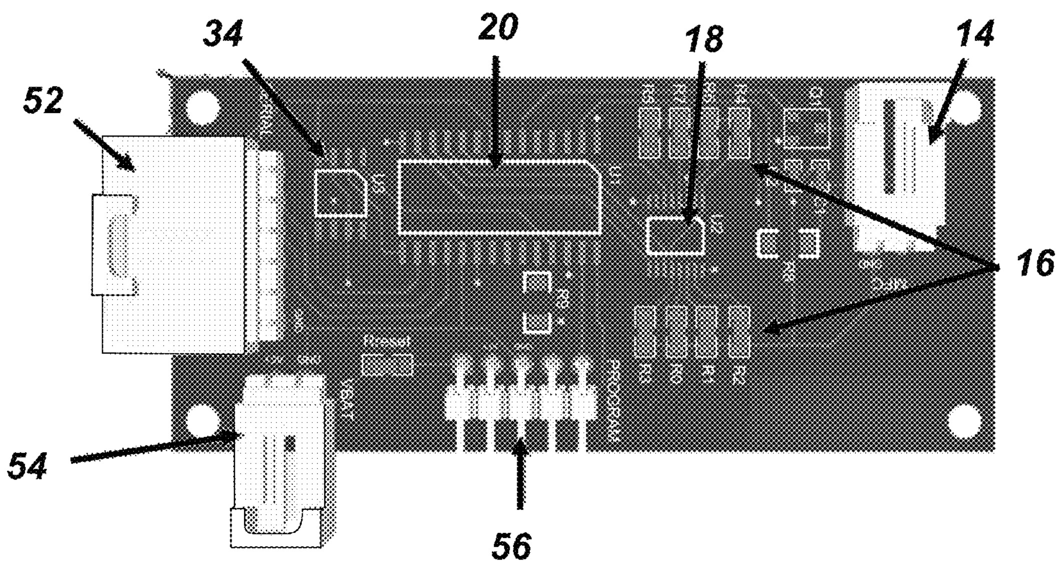
Figure 4:
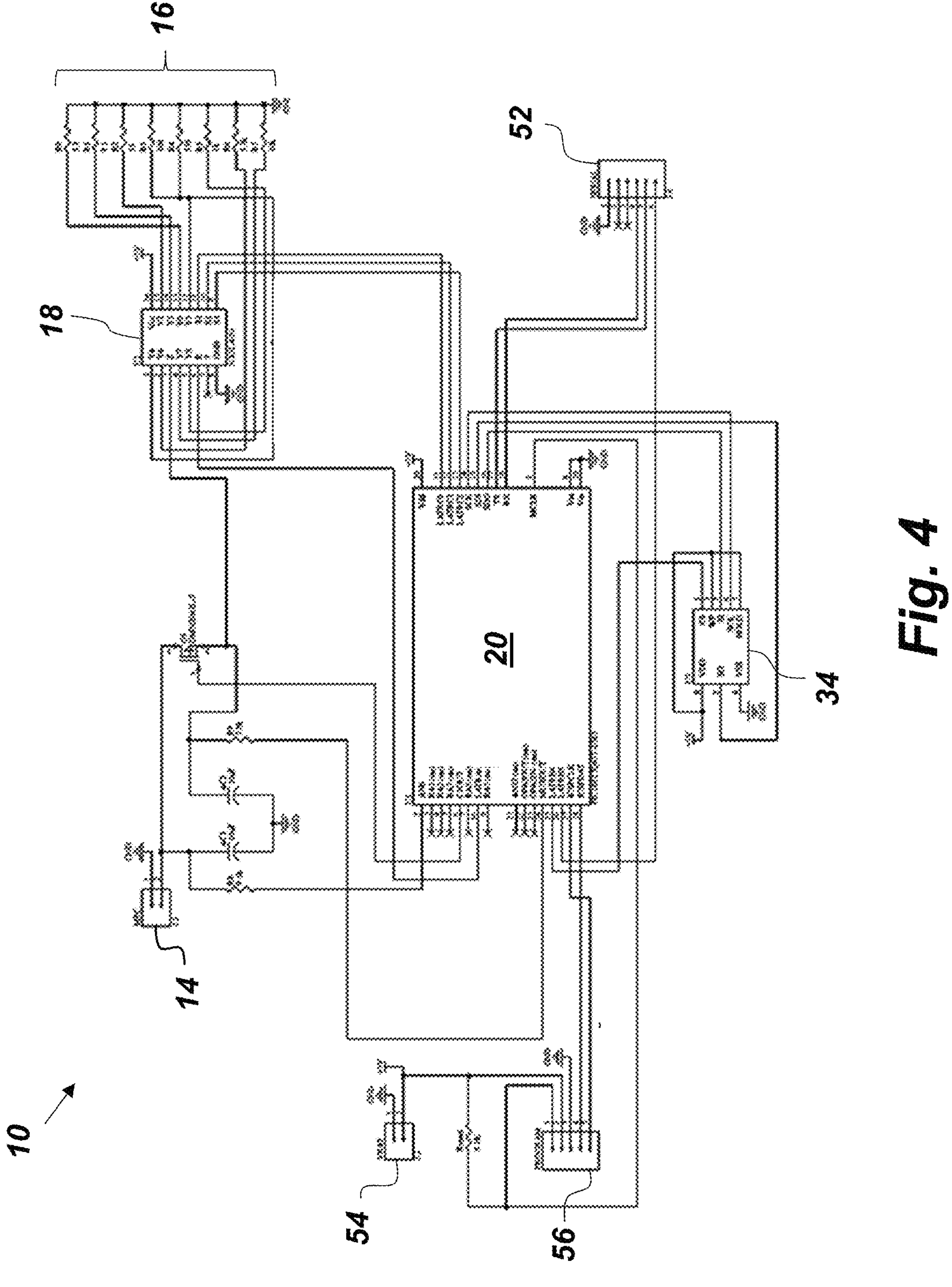
FIG. 4 is a schematic illustration of the printed circuit board shown in FIG. 3.

FIG. 3 is a top-view illustration of an example printed circuit-board layout for an embodiment of the DPStat 10. Connection points for the microcontroller 20 and the switch 18 are shown in FIG. 3 along with a serial port 52, a battery connection terminal 54, and a programming header 56. FIG. 4 is a schematic illustration of the printed circuit board shown in FIG. 3.

From the above description of the DPStat 10, it is manifest that various techniques may be used for implementing the concepts of DPStat 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that DPStat 10 is not limited to the particular embodiments described herein, but is capable of many embodiments without departing from the scope of the claims.

We claim:

1. A digital potentiostat for monitoring energy produced by a system under test (SUT) comprising:

a connection port configured to be connected to the SUT, wherein the SUT comprises an anode and a cathode;

a plurality of current-measurement resistors, each having a known resistance, wherein one of the current-measurement resistors is designated as an optimal resistor;

a switch operatively coupled to the plurality of current-measurement resistors; and a microcontroller operatively coupled to the connection port and to the switch, wherein the microcontroller is configured to monitor energy produced by the SUT by measuring a SUT output voltage across the optimal resistor, and wherein the microcontroller is further configured to direct the switch to change which current-measurement resistor is designated as the optimal resistor based on measured changes in the energy produced by the SUT.

2. The digital potentiostat of claim 1, wherein the SUT is a microbial fuel cell.

3. The digital potentiostat of claim 1, wherein if the energy measured across a given optimal resistor reaches an upper threshold, the microcontroller is configured to designate as the optimal resistor a different current-measurement resistor having a larger resistance than the given optimal resistor.

4. The digital potentiostat of claim 3, wherein if the energy measured across the given optimal resistor reaches a lower threshold, the microcontroller is configured to designate as the optimal resistor one of the current-measurement resistors having a smaller resistance than the given optimal resistor.

5. The digital potentiostat of claim 4, wherein the upper and lower thresholds are based on voltage range of the microcontroller.

6. The digital potentiostat of claim 5, wherein the microcontroller is further configured to measure an open circuit voltage (OCV) between the anode and the cathode, and to set a reference voltage to a user-defined percentage of the OCV.

7. The digital potentiostat of claim 6, wherein the microcontroller is further configured to compare the SUT output voltage to the reference voltage when determining whether or not to direct the switch to change which current-measurement resistor is designated as the optimal resistor such that the SUT will always be operating in a region that can be measured, and that the digital potentiostat will always be operating in a region that is optimized for a given environment.

8. The digital potentiostat of claim 7, further comprising an external memory connection terminal, a serial port, a battery, and a programming header all operatively coupled to the microcontroller.

9. The digital potentiostat of claim 8, wherein the switch is an analog switch.

10. A digital potentiometer system for measuring the energy output of a microbial fuel cell (MFC), comprising:

a low power microcontroller configured to control the operation of the system;

a current-measuring resistor configured to measure the current output of the MFC;

an automated selection mechanism operatively connected to the microcontroller, configured to automatically select the value of the current-measuring resistor;

a measurement logging module integrated within the microcontroller, configured to log open circuit voltage (OCV) and indirect current measurements to the internal memory of the microcontroller;

an external memory interface operatively connected to the microcontroller, allowing additional memory to be used if the internal memory is insufficient;

an intelligent protocol, known as Maximum PowerPoint Tracking (MPPT), implemented within the microcontroller, comprising:

a mechanism to measure the OCV of the MFC;

a reference voltage generator configured to set a reference voltage as a fraction of the measured OCV;

a comparison module configured to compare the voltage measured across the current-measuring resistor (referred to as MFC voltage) to the reference voltage;

an optimization module configured to determine if the current-measuring resistor's value is optimal based on the comparison results;

an adjustment mechanism configured to change the value of the current-measuring resistor if it is not optimal, ensuring the system operates at peak energy harvesting potential; and an output unit configured to display or communicate the determined measurements and adjustments.

11. The digital potentiometer system of claim 10, wherein the low power microcontroller is configured to perform real-time measurement and control operations, ensuring continuous optimization of the MFC's energy output.

12. The digital potentiometer system of claim 11, wherein the automated selection mechanism includes a switching circuit configured to dynamically change the current-measuring resistor based on the optimization module's determinations.

13. The digital potentiometer system of claim 12, wherein the measurement logging module is further configured to store historical measurement data, enabling performance analysis and optimization over time.

14. The digital potentiometer system of claim 13, wherein the external memory interface is configured to interface with a removable memory card or an external memory chip, providing additional storage capacity for measurement data.

15. The digital potentiometer system of claim 14, wherein the MPPT intelligent protocol is designed to continuously monitor and adjust the system to maintain operation at the maximum power point of the MFC.

16. The digital potentiometer system of claim 15, wherein the reference voltage generator is an analog-to-digital converter (ADC) configured to accurately set the reference voltage based on the OCV measurement.

17. The digital potentiometer system of claim 16, wherein the comparison module includes a differential amplifier configured to compare the MFC voltage and the reference voltage with high precision.

18. The digital potentiometer system of claim 17, wherein the optimization module is further configured to periodically recalibrate the current-measuring resistor values to account for environmental changes and ensure long-term accuracy.

19. The digital potentiometer system of claim 18, wherein the output unit includes a display screen or a communication interface for transmitting the measurement data to external devices or systems for further analysis.

20. The digital potentiometer system of claim 19, wherein the switching circuit is an analog switch.

* * * * *